Aug. 23, 1955     C. M. SHEPHERD     2,715,774
CURVE ANALYZING DEVICE
Filed Aug. 25, 1952
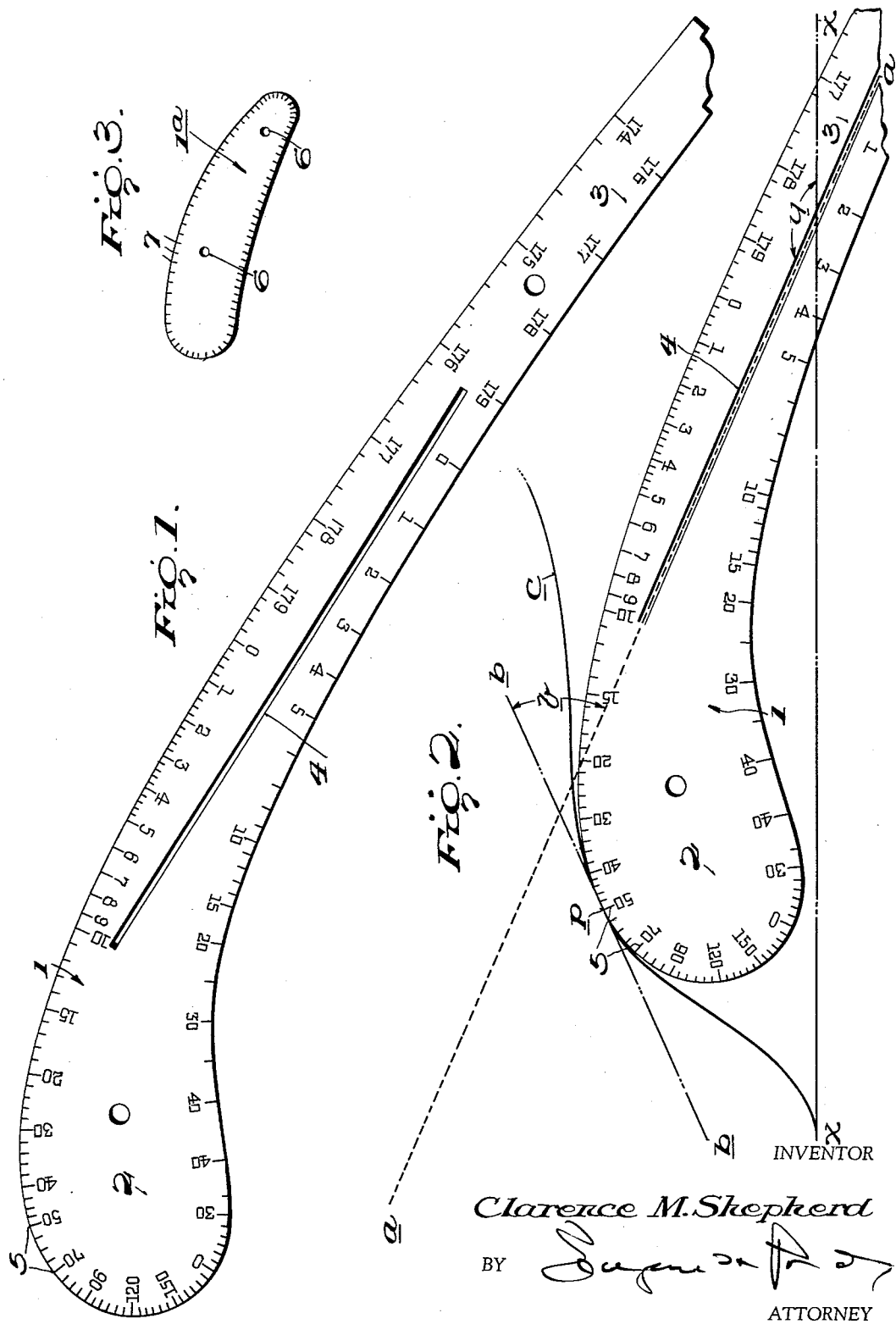
INVENTOR
Clarence M. Shepherd
BY
ATTORNEY

United States Patent Office 2,715,774
Patented Aug. 23, 1955

2,715,774

CURVE ANALYZING DEVICE

Clarence M. Shepherd, Washington, D. C.

Application August 25, 1952, Serial No. 306,120

1 Claim. (Cl. 33—1)

This invention relates to devices intended for use by technicians, engineers and draftsmen for analyzing curves or graphs plotted from numerical data, and more particularly for determining the characteristics of the curve at selected positions therealong.

In some types of scientific work it is necessary to determine from a previously plotted curve, the numerical values of certain functions such as the derivative, at a particular point upon the curve. One method of doing this is to draw a tangent to the curve at the point under consideration and extend this tangent until it intersects the base line of the curve. From the angle formed at this intersection, it is possible to determine numerical values of various mathematical functions of the curve at the point being investigated. Not only is this method of curve analysis slow and irksome, especially when repeated many times throughout the day, but it is necessarily undependable because of the difficulty of judging the slope of the tangent with the unaided eye, upon which slope the accuracy of the computations critically depend.

Another method of analyzing the curve consists of obtaining numerical values from various points on the plotted curve and subjecting these values to the necessary mathematical and numerical analyses. The labor involved is large and considerable mathematical training is necessary. Other methods are equally cumbersome or inaccurate.

It is an important object of the present invention to provide a handy tool, which I term a curve analyzing device, which can be used to determine the numerical value of the slope of the tangent, or some function of the slope of the tangent, such as the derivative, at a selected point on a plotted continuous curve.

More particularly the curve analyzing device of the invention takes the form of a template in the shape of an irregular curve, or "French curve," having non-circularly curved edges, this template additionally including means for drawing a straight line of reference. The template is graduated upon its marginal edges to designate the angles formed by the intersection of the line of reference with tangents to the curve of the template at different points throughout its length. Thus, by placing the template upon the curve under study and matching an arc upon the template with a selected arc upon the curve, the angle formed between the base line of the curve and the tangent to a point on the common arc may be readily computed by adding to the angle represented by the graduation on the template at the point of its coincidence with the curve, the angle defined by the intersection of the line of reference with the base line of the curve. By the term "base line of the curve" is meant any fixed straight line of known position, most generally the axis of abscissas.

Other objects and advantages will be apparent from the following detailed description of a preferred embodiment of the invention, reference being had to the annexed drawing in which:

Figure 1 is a view of a curve analyzing template;

Figure 2 is a view showing the template applied to a curve in the contemplated manner of use of the device; and Figure 3 is a modified form of the curve analyzing template.

In Figs. 1 and 2 of the drawing is shown a curve analyzing template 1 composed preferably of celluloid or other stiff, transparent material. The shape of the template is that of an irregular curve whose edge is a non-circular curve throughout its length, so as to define a bulbous head portion 2 and a narrowed tail portion 3. The center line of the template is, as shown in Fig. 1, of gradually decreasing curvature from its head portion through its tail portion. By the term "irregular curve" is meant any curve that is not an arc of a circle. Extending generally lengthwise of the template is an elongated open slot 4 constituting a straight-edge for drawing a line of reference $a$—$a$ to which graduations 5 marked on and extending around the marginal edge of the template are correlated. These graduations preferably are provided upon opposite sides of the template.

As most clearly shown in Fig. 2, the graduations are indicated in degrees, the graduation at a particular point designating the angle made by the intersection of the line of reference $a$—$a$ with a tangent to that point on the curved edge of the template, one of these tangent lines being indicated by way of example by the broken line $b$—$b$.

The manner of use of the template just described is best illustrated in Fig. 2. Supposing that it be required to determine the numerical value of the slope of the tangent at a point P on the curve C constructed upon a base line X—X. The template is laid flatwise upon the curve and shifted about until an arc upon the template corresponds to the curve at the point P. After a little practice this can be accomplished quickly and accurately. Since the point P on the template now represents a common point of tangency to both the template and the curve, it is only necessary to read the graduation on the template coinciding with the point P, interpolating if necessary, in order to find the angle in degrees made by the line of reference $a$—$a$ with the tangent $b$—$b$. Let it be assumed that this angle, designated angle $v$, is 50 degrees. This value is noted down on a computation sheet.

Next the pointed end of a pencil is inserted in the slot 4 and a line drawn to indicate the line of reference $a$—$a$. The template is removed from the curve and the reference line $a$—$a$ is extended to intersect the base line X—X to form the obtuse angle $y$. By means of a protractor the value of this angle $y$ is determined. Let it be assumed that angle $y$ is 156 degrees. Now by adding angle $v$ to angle $y$ the sum of the angles is 206 degrees, or 26 degrees (in the third quadrant). By consulting a trigonometric table the tangent of 26 degrees is found to be 0.488, which is the slope of the tangent of the curve C at the point P.

Instead of being expressed in degrees the graduations may be in terms of trigonometric functions, such as sine, cosine and tangent of the corresponding degrees, this being a matter of choice depending upon the mathematical form in which the curve is to be expressed.

Any suitable provision may be made for drawing the straight line of reference, it being simply necessary to provide means upon the template for marking two points by which the line of reference is determined.

The template may take other forms than that just described. As shown in Fig. 3 the template 1$a$ is shown as shaped as an oval bent about its longitudinal axis. The template is provided with two holes 6 through which the point of a pencil may be inserted to mark two dots which can later be connected to produce the line of reference corresponding to the line $a$—$a$ of Fig. 2. Graduations 7 in degrees or trigonometric functions are provided about the marginal edge of the template. The mode of use of this form of template is essentially the same as that described for the template of Figs. 1 and 2.

Various changes in construction and design may be made in the curve analyzing device described and shown without departing from the scope of my invention as defined by the following claim.

I claim:

A template comprising an elongated sheet of material having its outline in the form of a continuous irregular curve and defining a bulbous head portion and a relatively narrow tail portion, the center line of said irregular curve defining a curve of progressively decreasing curvature extending throughout the head and tail portions of the template, a marking opening in the template for the insertion of a pencil point for establishing a straight line of reference, and graduations at spaced points along the margin of the template coextensive with the irregular curve and designating the angle formed by the intersection of said line of reference with tangents to the respective points upon the curve.

References Cited in the file of this patent

UNITED STATES PATENTS

| | | |
|---|---|---|
| 177,257 | Lorenz | May 9, 1876 |
| 1,409,723 | Jacob | Mar. 14, 1922 |
| 1,764,581 | Shibuya | June 17, 1930 |
| 2,214,408 | Arizpe | Sept. 10, 1940 |
| 2,364,529 | Hill | Dec. 5, 1944 |
| 2,555,596 | Murray | June 5, 1951 |

FOREIGN PATENTS

| | | |
|---|---|---|
| 627,140 | Great Britain | July 29, 1949 |

OTHER REFERENCES

Frederick Post Co. (Chicago, Ill.). Catalogue of Drafting Materials, 18th ed. (Copy in Div. 661, 1936.) Pg. 220.